(12) United States Patent
Rodriguez et al.

(10) Patent No.: US 8,511,770 B2
(45) Date of Patent: Aug. 20, 2013

(54) BI-DIRECTIONAL COLOR PRINTING

(75) Inventors: Raul Rodriguez, Barcelona (ES);
Michel Georges Encrenaz, Barcelona
(ES); Nuria Jornet, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 351 days.

(21) Appl. No.: 12/778,338

(22) Filed: May 12, 2010

(65) Prior Publication Data

US 2011/0279506 A1    Nov. 17, 2011

(51) Int. Cl.
*B41J 29/38*    (2006.01)
(52) U.S. Cl.
USPC .............................................. 347/5
(58) Field of Classification Search
USPC .................. 358/1.9; 347/14, 15, 5, 9, 19
See application file for complete search history.

(56) References Cited

U.S. PATENT DOCUMENTS

| 635,469 | A1 | 3/2002 | Ross |
|---|---|---|---|
| 6,905,190 | B1 | 6/2005 | Otsuka et al. |
| 6,938,977 | B2 | 9/2005 | Corbin et al. |
| 6,980,328 | B2 | 12/2005 | Hudson |
| 705,403 | A1 | 5/2006 | Underwood et al. |
| 7,133,159 | B2 * | 11/2006 | Yang et al. ............... 358/1.9 |
| 7,593,134 | B2 | 9/2009 | Van de Capelle et al. |
| 2003/0048327 | A1 | 3/2003 | Serra et al. |
| 2004/0113975 | A1 | 6/2004 | Brookmire et al. |
| 2004/0196476 | A1 * | 10/2004 | Yang et al. ............... 358/1.9 |
| 2010/0013878 | A1 | 1/2010 | Spaulding et al. |

* cited by examiner

*Primary Examiner* — Lam S Nguyen (57) ABSTRACT

A source image is converted to a printable image that is constrained to a bi-directional gamut achievable by both a forward-first print mode and a reverse-first print mode. While the printable image is printed, a print system alternates between forward and reverse passes. The print system uses a forward-first color map during the forward passes and a different reverse-first color map during the reverse passes.

14 Claims, 6 Drawing Sheets

```
PRINT SWATH SW1 USING FORWARD PASS
ADVANCE PRINT MEDIA ONE SWATH
PRINT SWATH SW2 USING REVERSE PASS
ADVANCE PRINT MEDIA ONE SWATH
PRINT SWATH SW3 USING FORWARD SWATH
. . .
```

FIG. 5

| TABLE FOR DETERMINING BI-DIRECTIONAL GAMUT 601 | | | | | | |
|---|---|---|---|---|---|---|
| | FORWARD FIRST GAMUT | | REVERSE FIRST GAMUT | | BI-DIRECTIONAL GAMUT | |
| H | HIGHEST S | LOWEST L | HIGHEST S | LOWEST L | LOWER S | HIGHER L |
| | | | | | | |

FIG. 6

P34
ASSIGN ROWS TO A SAMPLING OF HUES    P71

FOR EACH HUE DETERMINE    P72
FROM SPECTROGRAPHIC ANALYSIS

MAXIMUM SATURATION FOR FORWARD-FIRST MODE:
MINIMUM LIGHTNESS FOR FORWARD-FIRST MODE:
MAXIMUM SATURATION FOR REVERSE-FIRST MODE:
MINIMUM LIGHTNESS FOR REVERSE-FIRST MODE:

FOR EACH HUE DETERMINE    P73

LOWER MAXIMUM SATURATION
HIGHER MINIMUM LIGHTNESS

LOWER MAXIMUM SATURATIONS    P74
&
HIGHER MINUMUM LIGHTNESSES
DETERMINE BOUNDARIES OF BI-
DIRECTIONAL GAMUT

```
PRINT SWATH SW1 USING FORWARD PASS
ADVANCE PRINT MEDIA ONE-HALF SWATH
PRINT SWATH SW1/SW2 USING REVERSE PASS
ADVANCE PRINT MEDIA ONE-HALF SWATH
PRINT SWATH SW2 USING FORWARD SWATH
ADVANCE PRINT MEDIA ONE-HALF SWATH
PRINT SWATH SW2/SW3 USING REVERSE PASS
ADVANCE PRINT MEDIA ONE-HALF SWATH
PRINT SWATH SW3 USING FORWARD SWATH
. . .
```

FIG. 10

BI-DIRECTIONAL COLOR PRINTING

BACKGROUND

Color inkjet printers provide multiple print modes that allow a user to trade off print quality and print speed. One of the sacrifices made for high-speed operation is hue-shift banding, i.e., differences in color or lightness between swaths printed in opposite direction. Hue shift can be a result of the order in which colors to be mixed are deposited on print media. For example, the color resulting from depositing cyan over magenta during a forward print motion can be different from the color resulting from depositing magenta over cyan during a reverse printing motion. As a result, a visible boundary may appear where a forward (e.g., left to right) printed band meets a reverse (e.g., right to left) printed band.

The banding effect can be substantially eliminated in higher-quality modes, e.g., that use multiple passes per swath or that print in only one direction; however, these approaches sacrifice speed for quality. The banding effect has been reduced by using different color maps for forward and reverse printing without sacrificing. However, further reductions in banding are desired.

DETAILED DESCRIPTION

Figure 1:
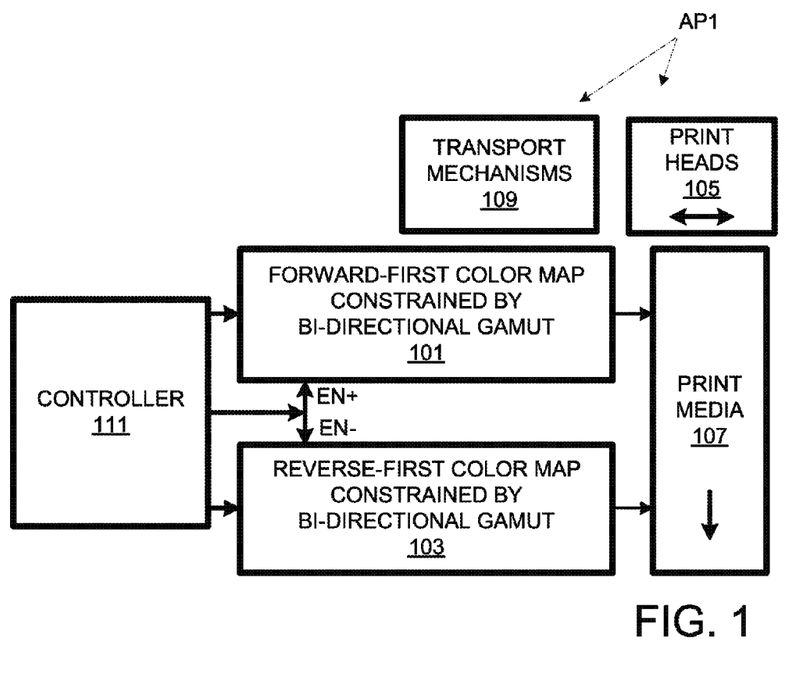
FIG. 1 is a schematic diagram of a print system in accordance with a first embodiment.

As print system AP1 prints, it alternates between forward-first and reverse-first color maps 101 and 103, both of which are constrained to a common bi-directional gamut, as indicated in FIG. 1. Banding artifacts due to differences in forward and reverse gamuts are reduced or eliminated by using a reduced bi-directional gamut. Accordingly, print system AP1 makes a favorable tradeoff of a less-perceptible sacrifice in gamut for a more-perceptible reduction in hue-shift banding to achieve a net gain in image quality without reducing print throughput.

Printing system AP1 includes print heads 105 for delivering ink to print media 107, transport mechanisms 109 for advancing a print medium 107 longitudinally relative to print-heads 105 and for moving print heads 105 in forward and reverse transverse directions relative to print medium 107. Both color maps 101 and 103 are constrained to produce colors within a bi-directional gamut of colors that can be produced both in a forward-first directional mode and in a reverse-first directional mode. Printing system AP1 includes a controller 111 for controlling printing system AP1 while printing a source image to print medium 107. During printing, controller 111 applies forward-first color map 101 during forward passes and reverse-first color map 103 during reverse passes.

Figure 2:
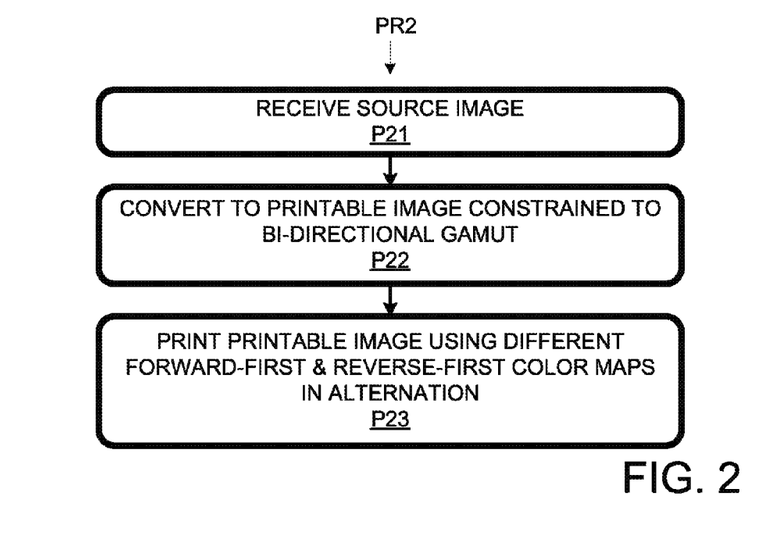
FIG. 2 is a method implemented in the context of the system of FIG. 1.

Printing system AP1 employs a process PR2 including a process segment P21 in which a source image is received, as shown in FIG. 2. At process segment P22, the source image is converted to a printable image that is constrained to a bi-directional gamut. The bi-directional gamut includes only those colors producible in both the forward-first directional mode and in the reverse-first directional mode to the exclusion of those colors achievable in one directional mode but not the other. Process segment P23 involves printing an image using forward-first color map 107 during forward passes and reverse-first color map 109 during reverse passes. Thus, banding artifacts due to differences in the forward and reverse gamuts are reduced or eliminated.

Figure 3:
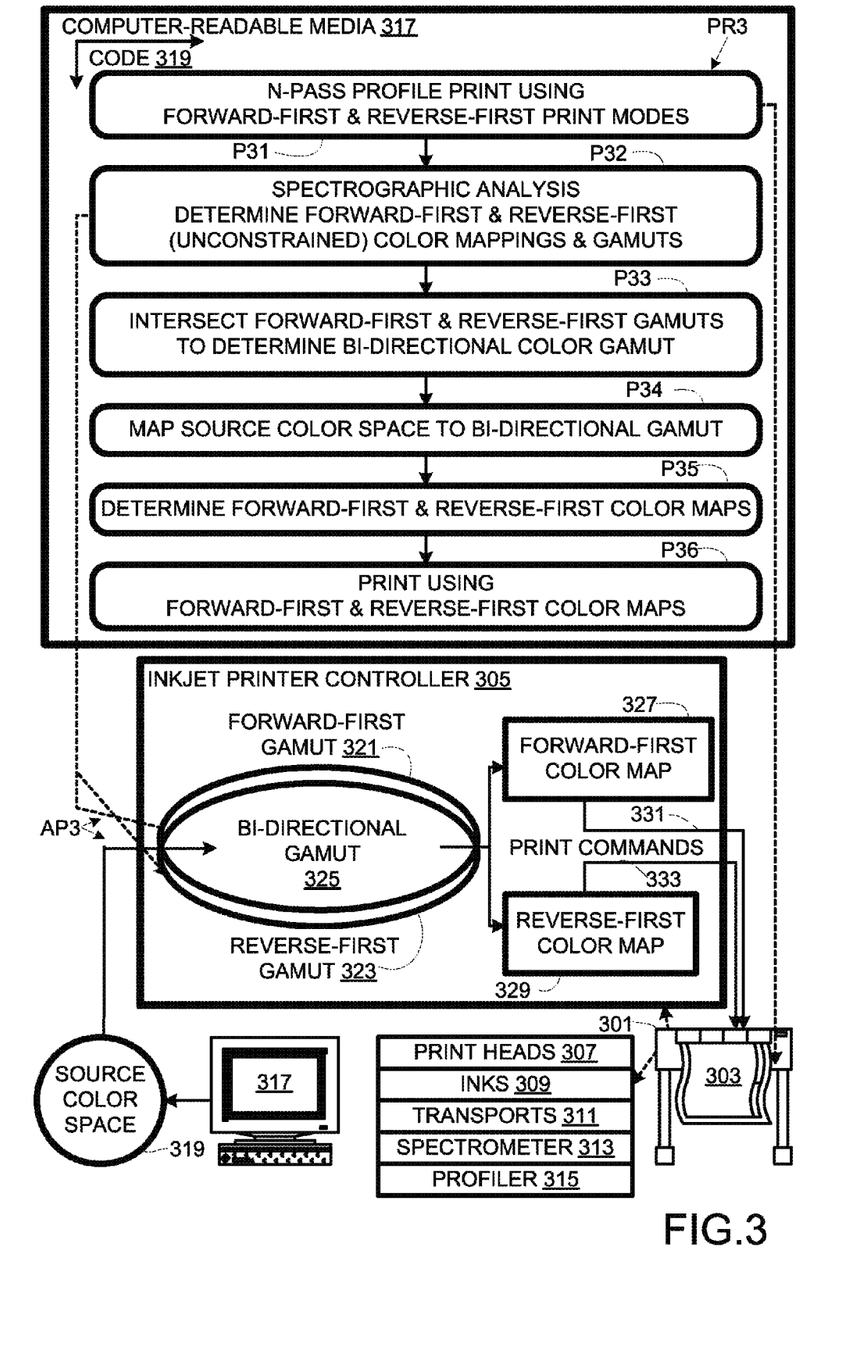
FIG. 3 is a combined schematic diagram and flow chart of a second print system and a second method implemented therein.

Illustrative printing system AP3, shown in FIG. 3, includes a printer 301 for printing an image on print media 303. Printer 301 includes a controller 305, print heads 307, inks 309, print-head and print-media transports 311, a spectrographic subsystem 313 including a spectrometer, color profiler 315, and controller-readable media 317 encoded with controller-readable and executable program code 319.

Figure 4:
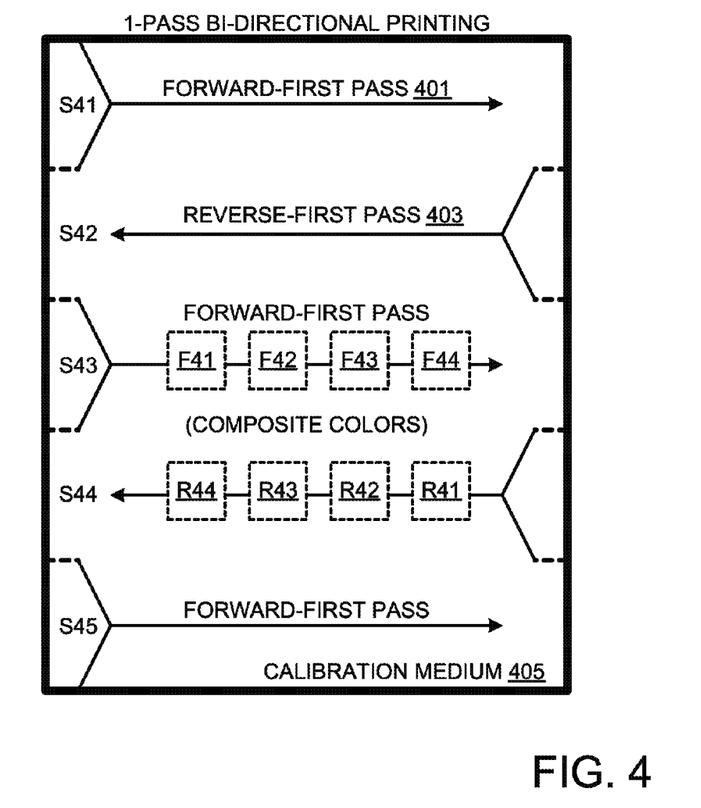
FIG. 4 is a schematic representation of a printed profiling sheet printed by and used in the system of FIG. 3 in a 1-pass mode.
Figure 5:
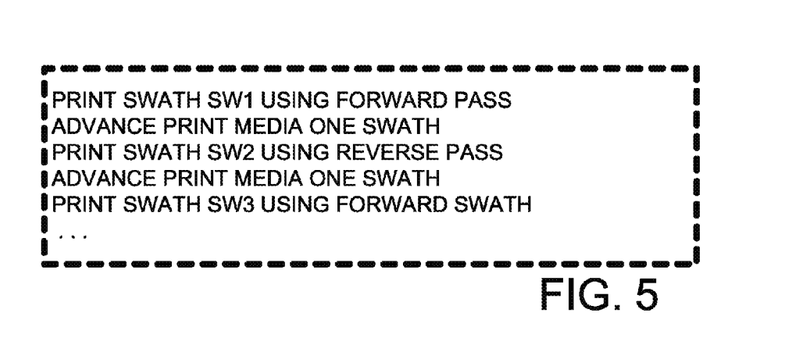
FIG. 5 is a list of a sequence of printing steps used in the 1-pass mode represented in FIG. 4.

Program code 319, when executed by controller 305 causes print system AP1 to implement process PR3, flow-charted in FIG. 3. Process segment P31 of process PR1 involves an N-pass calibration print based on calibration vectors 315 using forward-first and reverse-first print modes in alternation, where N is a counting (positive integer) number. A forward-first (left-to-right) 1-pass pass 401 and a reverse-first (right-to-left) 1-pass pass 403 are represented in FIG. 4 relative to calibration medium 405. While the modes are referred to above as "forward-first" and "reverse-first" to facilitate generalization, in fact, in 1-pass printing, the modes are actually "forward only" and "reverse-only". Controller 305 (FIG. 3) controls transports 311 according to the procedure shown in FIG. 5 in applying composite color patches to profile medium 405. Since the print medium can affect color rendition, profile medium 405 is the same type of medium as print medium 303 to which an image is to be printed in 1-pass mode.

Printing using color profiler 315 yields an array of color patches, e.g., F41-F44 and R41-R44, each of a solid (non-gradient) color. All or most patches are of a composite color, e.g., using two or more ink colors, since such colors are most likely to be subject to hue shift due to differences in the order in which the component colors are deposited.

While eight patches are shown in FIG. 4 for expository purposes, in practice tens or hundreds of patches can be used so that each color corresponding to an entry in a color map is represented by two patches, one for a forward-first mode and one for a reverse-first mode. In the specific case of system AP3, profiler 315 is a Monaco Profiler, available from X-Rite Incorporated, which can provide for 1728 color patches for each print direction mode. For example, patches F41 and R41 can both represent the same mixtures of magenta and cyan, but with the magenta and cyan deposited in different orders. Note that patches F41-F44 are printed in swath S43, which is generated in a forward pass, while patches R41-R44 are printed in swath S44, which is generated using a reverse pass.

More patches can be accommodated by calibration medium 405 by printing patches in other swaths, e.g., representative swaths S41, S42, and S45. Patches can be printed in multiple-rows per swath, and more than four patches can be printed per row. Also, medium 405 can accommodate more than the illustrated five swaths SW1-SW5. In principle, fewer patches can be used, e.g., using fewer patches per swath. The patches are dimensioned so that spectrographic subsystem 313 can accurately determine the as-printed color of each patch. The patches in FIG. 4 are square, while other embodiments use other shapes. The patches can abut or be separated.

At process segment P32 (FIG. 3), the as-printed color of each patch is determined. To this end, spectrographic subsytem 313 determines the as-printed color each patch as media 405 (FIG. 4) advances. Spectrographic subsystem 313 then analyzes the resulting as-printed color data and generates "unconstrained" forward-first and reverse-first color maps by mapping as-printed colors to the print commands used to produce the respective patch. These color maps are "unconstrained" in that the respective full gamut of colors that can be printed by print system AP3 the selected N-pass directional mode is represented.

The color gamuts associated with the forward-first and reverse-first print modes can be different but overlapping (i.e., each print direction mode includes colors not accessible using the other print direction mode) due to differences in the order in which ink colors are deposited. Thus, process segment PS2 yields distinct but overlapping gamuts, including a forward-first gamut 321 and a reverse-first gamut 323. In a process segment P33, a bi-directional color gamut 325 is obtained that is within or that equals or approximates the intersection of forward-first gamut 321 and reverse-first gamut 325.

At process segment P34, a source color space 319 is mapped to bi-directional gamut 325, either directly or using an intermediate conversion to unconstrained forward-first and reverse-first color maps, which are then mapped to bi-directional gamut 325. The source color space can be any color space, e.g., RGB, CMY, or HSV. The source color space can be a standard color space, e.g., CIE LAB, to which images are converted for further conversion to the CMY color space employed by printer system AP3. Colors in source color space 319 that are not printable by printing system AP3 or that can be printed only in one directional print mode of a selected number of passes are mapped to colors that can be produced by both direction print modes for the selected number of passes.

The transformations from source color space 319 to bi-directional gamut 325 can be soft limited or hard limited. In the hard-limited case, colors in source color space 319 having counterparts in gamut 325 are mapped to those respective colors. Colors in source color space 319 that have no exact counter parts in gamut 325 are mapped to colors of the same hue and the closest luminance and saturation, with the latter being the most readily compromised. In other words, color space 319 can be hard limited to bi-directional gamut 325. In the soft-limited case, the colors source color space 319 have their saturations and lightnesses linearly or non-linearly scaled so that differences between colors in color space 319 show up as differences, albeit smaller differences, in color in gamut 325.

Figure 6:
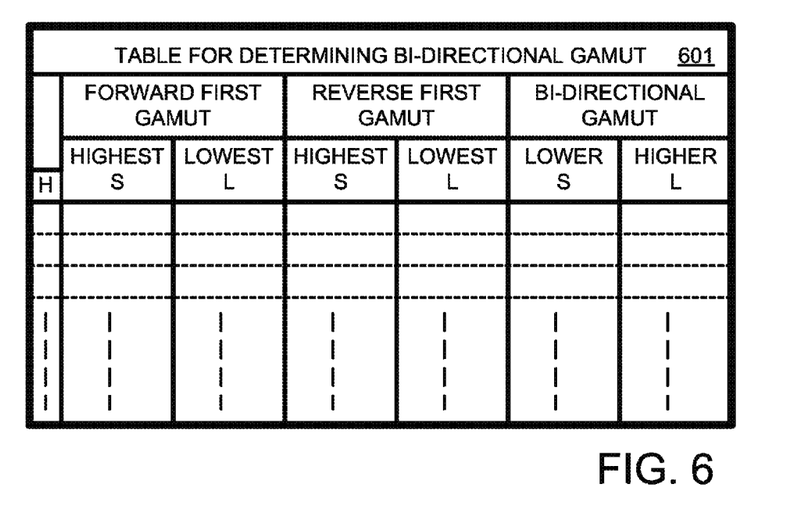
FIG. 6 is a schematic representation of a table used to generate a bi-directional gamut in accordance with the method of FIG. 3.
Figure 7:
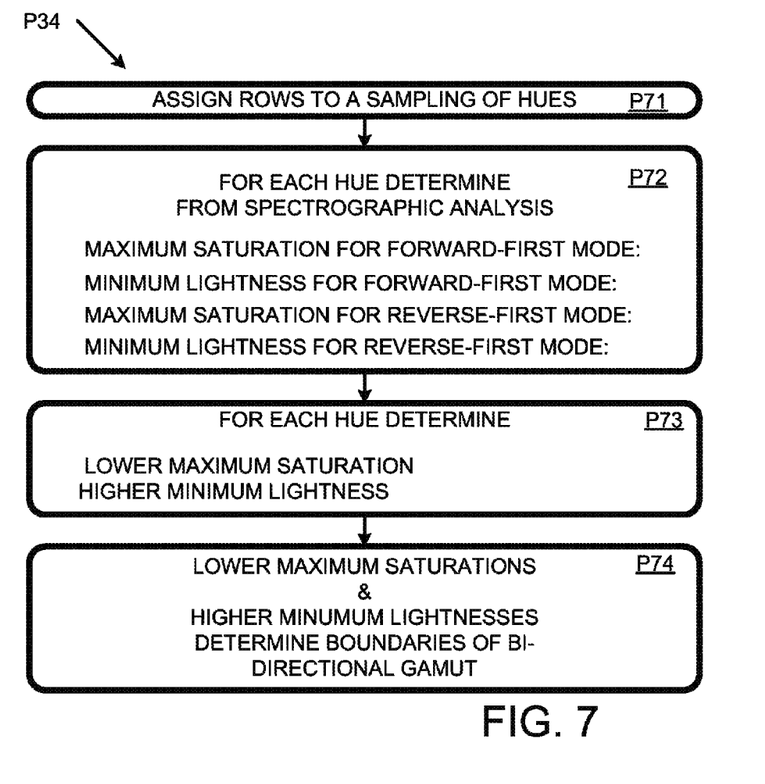
FIG. 7 is a flow chart of process substeps that use the table of FIG. 6 to generate the bi-directional gamut.

Process segment P34 can be implemented using a table 601 of FIG. 6 and a process as flow charted in FIG. 7. At process (sub)segment P71, composite color hues are assigned to respective rows of the table of FIG. 6. At segment P72, maximum saturations and minimum lightnesses are determined for each directional print mode for each hue; the values are entered in the second through fourth columns of table 601. In principle, the minimum saturation and the maximum lightness could be considered as well. However, as colors of low saturation and high lightness are relatively easy to achieve in print system AP3, they are likely to be well within bi-directional gamut 325. Accordingly, in practice, they need not be considered in determining the boundaries for bi-directional gamut 325.

At process segment P73, the lower maximum saturation and the higher minimum lightness are determined for each hue. These then represent the extremes of the desired bi-directional gamut, which is thus determined at process segment P74.

Process PR1, FIG. 3, continues with process segment P35, which determines a forward-first color map 327 and a reverse-first color map 329, both of which are constrained to produce as-printed colors within bi-directional gamut 325. For forward-first print mode, for each color represented by a patch resulting from calibration print segment P11, the print commands that yielded that patch can be assigned to that color in forward-first color map 327. For each color not represented by a patch produced in forward-first print mode, an associated set of print commands can be interpolated from the print commands used to produce patches of neighboring colors to provide forward-first color map 327. The procedure for producing reverse-first color map 333 is analogous, but uses patches printed in reverse-first print mode.

At process segment P36, printing system AP3 prints an image, e.g., received from computer 317, on print medium 303, e.g., using process segments P21-P23 of FIG. 2. To this end, controller 305 uses forward-first color map 327 for forward passes and reverse-first color map 329 for reverse passes. The result is exceptionally low banding considering the number of passes involved.

Figure 8:
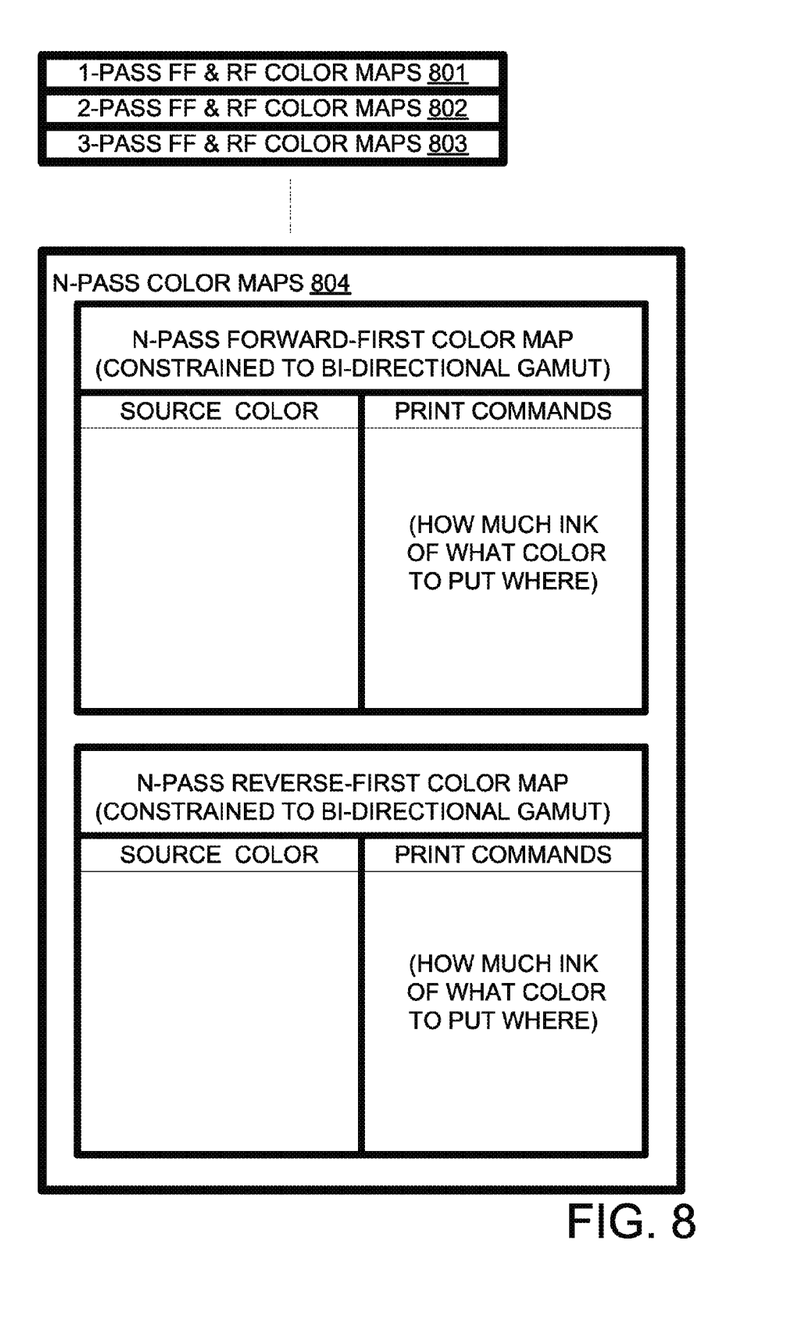
FIG. 8 is a representation of color maps useable in the system of FIG. 3 for N-pass bi-directional modes, for different values of N.

As indicated in FIG. 8, separate pairs of color maps can be required for each value of N, e.g., number of passes in the print mode. Thus, there can be one pair 801 of color maps for 1-pass printing, another pair 802 for 2-pass printing, another pair 803 for 3-pass printing. Each pair of color codes can have a structure similar to that shown for N-pass color maps 804, with a column for source colors and a column for respective associated print commands.

Since banding is less prominent in higher quality modes that use more passes, the law of diminishing returns applies for higher values of N. Accordingly, in print system AP3, process PR3 is used only for values of N below 10. Nonetheless, one of the advantages of process PR3 is that it can optimize not only N=1 print modes, but also multi-pass print modes.

Figure 9:
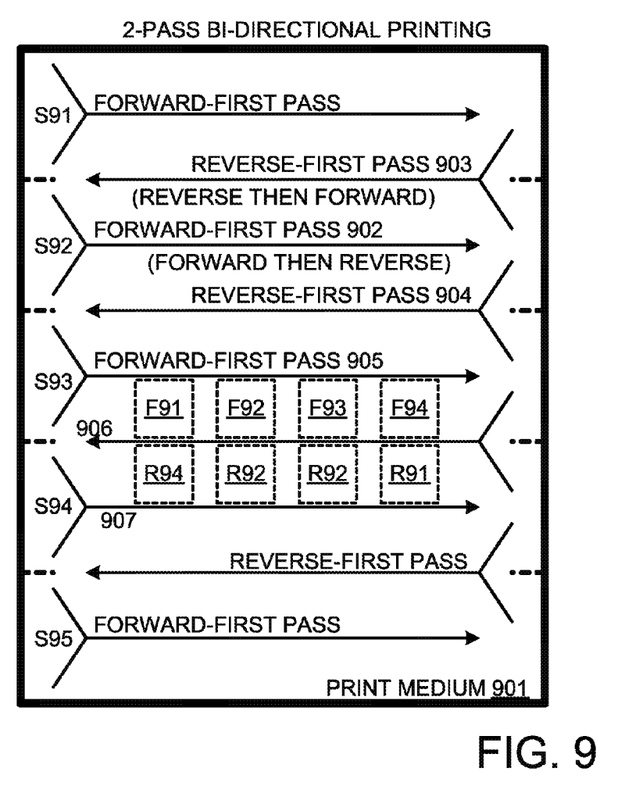
FIG. 9 is a schematic representation of a printed profile sheet printed by and used in the system of FIG. 3 in a 2-pass mode.
Figure 10:
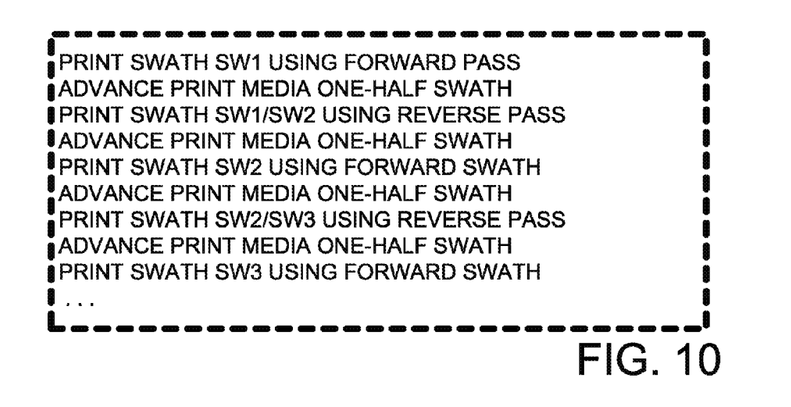
FIG. 10 is a list of a sequence of printing steps used in the 2-pass mode represented in FIG. 9.

The applicability of process PR3 to multi-pass print modes in general and 2-pass printing in particular, can be understood with reference to FIG. 9, which represents a calibration print medium 901 printed with patches selected by color profiler 315 (FIG. 3) in a two-pass print mode. For expository purposes, print medium 901 is shown for expository purposes divided into five swaths S91-S95; in practice the number of swaths would be larger.

For each swath S92-S94 excluding the top (S91) and bottom (S95), the swath includes ink from three passes. For example, swath S92 can be covered with ink from forward pass 902. In addition, the upper half of swath S92 can include ink from a previous reverse pass 903, and the lower half of swath S92 can include ink from a subsequent reverse pass 904. Accordingly, forward-first patches F91-F94 are printed in the lower half of swath S93 which is printed first by forward pass 905 and second by reverse pass 906. Also, accordingly, reverse-first patches R91-R94 are printed in the upper half of swath S94, which is printed first by reverse pass 906 and then by forward pass 907.

While in the N=1 case, each swath is printed in only one print direction, in the N=2 case, each half swath is printed in two directions. Some half swaths are printed using a forward pass followed by a reverse pass (forward-first mode) and other half swaths are printed using a reverse pass followed by a forward pass (reverse-first mode). The terminology "forward-first" and "reverse-first" applies as well in the 1-pass mode, but in that case "forward-first" is also "forward only" and "reverse-first" is also "reverse-only". In an N-pass mode, each 1/N longitudinal portion of a swath can receive ink from N passes. The fractional swaths are alternatively printed forward-first and reverse-first, as in the case with N=2.

Process PR3 can be performed entirely within a printer having a spectrophotometer. Alternatively, some process segments can be performed externally, e.g., in a computer performing raster image processing (RIP).

The optimal color maps can vary according to the number of passes, the type of print-media involved, the type of ink used, operating conditions for the printer, and other factors. Accordingly, process PR3 can be implemented whenever there is a change due to one of the foregoing factors or whenever excessive hue-shift banding begins to appear in prints.

Herein, a "color" is a multi-dimensional entity that can be represented as a vector in a multi-dimensional color space such as RGB, CMY, HSV, HSL, etc. Herein, a "swath" is a transverse band of a printed image that can be covered in a single pass of a print head. An "N-pass print mode" is a print mode in which a swath can receive ink during N consecutive) passes of one or more print heads. For example, this can be achieved by advancing print media longitudinally 1/N swaths after each pass. In a "unidirectional" print mode, all printing is achieved while a printhead is moving is a single, e.g, forward, direction. Typically the print head must move in a reverse direction between passes, but no printing is done during the reverse motion. "Bi-direction" printing involves alternately printing during a forward passes of the print head in an arbitrarily defined forward direction and reverses passes of the print head in a reverse direction opposed to the forward direction.

In the context of an N-pass print mode, "forward-first" directional mode refers to a series of N passes in alternating mode in which the first pass is in the forward direction. In the context of an N-pass print mode, "reverse-first" directional mode refers to a series of N-passes in which the first pass is in the reverse direction. Note that in a multi-pass node (N>1), a pass can belong to more than one N-pass series, since they overlap. For N=1, "forward-first" is the same as "forward-only" and "reverse-first" is the same as "reverse-only" as there is only one pass per swath and no overlap between successive passes.

Herein, the phrase "storage media" refers exclusively to non-transitory media. The term "controller" as used herein, refers to a physical device of combination of devices that include non-transitory tangible materials including at least one metal material.

Herein, related art is described to facilitate understanding of the invention. Related art labeled "prior art", if any, is admitted prior art; related art not labeled "prior art" is not admitted prior art. The described and other variations upon and modifications to the illustrated embodiments are provided by the present invention, the scope of which is defined by the following claims.

What is claimed is:

1. A process comprising:
    receiving a source image by a print system having forward-first and reverse-first directional modes characterized by different gamuts when printing to media;
    converting said source image to a printable image so that it is constrained to a bi-directional gamut achievable by both of said print modes, wherein the bi-directional gamut includes first colors producible in both the forward-first directional mode and in the reverse-first directional mode, and wherein the converting includes mapping second colors, achievable in one directional mode but not the other, to first colors producible by both of said modes; and
    alternating between a forward-first color map and a reverse-first color map while printing said printable image, each of said color maps respectively mapping colors of said bi-directional gamut to print commands, said color maps being different.

2. A process as recited in claim 1 further comprising:
    prior to receiving said source image, printing a profile set of solid composite-color patches on media of a first type using said print modes in alternation;
    spectrographically analyzing said patches to determine forward-first and reverse-first gamuts respectively achievable by said forward first-and reverse-first directional modes;
    generating said bi-directional gamut from said forward-first and reverse-first gamuts; and
    based on said spectrographic analysis, generating said forward-first and said reverse-first color maps so that they are constrained to said bi-directional gamut.

3. A method as recited in claim 2 wherein each of said forward-first and reverse-first gamuts has colors that are not in said bi-directional gamut.

4. A method as recited in claim 2 wherein said bi-directional color map is equal to or within the intersection of said forward-first and reverse-first gamuts.

5. A method as recited in claim 4 wherein said bi-direction gamut is defined at least in part by respective maximum saturations and respective minimum lightnesses for given hues such that,
    for each given hue, the respective maximum saturation being the lesser of maximum saturations for the same hue in said forward-first and reverse-first gamuts, and
    for each given hue, the respective minimum lightnesses being the greater of the respective minimum lightnesses for the same hue in said forward-first and reverse-first gamuts.

6. A print system comprising:
    one or more print heads for depositing colored ink on a print medium;
    transport mechanisms for moving said print medium longitudinally and said print heads in forward and reverse passes; and
    a controller for causing said print heads to deposit said color ink on said print media using a forward-first color map during forward passes of said print head and using a reverse-first color map during reverse passes of said print head, said color maps using different print commands to print the same colors for at least some colors, said color maps being constrained to a bi-direction gamut producible by both said forward-first color map and said reverse-first color map,
    wherein the bi-directional gamut includes first colors producible in both a forward-first directional mode and in a reverse-first directional mode, and wherein the controller is to map second colors, achievable in one directional mode but not the other, to first colors producible by both of said modes.

7. A print system as recited in claim 6 further comprising a spectrographic subsystem including sensors for detecting the colors of patches printed on a profile printout, said spectrographic subsystem being configured to provide a spectrographic analysis of said profile printout for determining forward-first and reverse-first gamuts respectively for a forward-first directional mode and a reverse-first directional mode.

8. A print system as recited in claim 7 wherein said controller provides for generating said bi-directional gamut from said forward-first and reverse-first gamuts.

9. A print system as recited in claim 8 wherein said controller provides for generating said bi-directional gamut from said forward-first and reverse-first gamuts so that said bi-directional gamut is contained by the intersection of said forward-first and reverse-first gamuts.

10. A print system as recited in claim 8 wherein said controller provides for generating said forward-first color map and said reverse-first color map based on said spectrographic analysis.

11. A print system as recited in claim 8 wherein said controller is configured to generate said bi-direction gamut so that it has respective maximum saturations and respective minimum luminance for given hues such that,
  for each given hue, the respective maximum saturation being the lesser of maximum saturations for the same hue in said forward-first and reverse-first gamuts, and
  for each given hue, the respective minimum lightness being the greater of the respective minimum lightnesses for the same hue in said forward-first and reverse-first gamuts.

12. A computer product comprising controller-usable storage media encoded with program code that, when executed by a controller of a print system, causes said print system to:
  convert a source image to a printable image so that it is constrained to a bi-directional gamut achievable by both of a forward-first directional mode and a reverse-first directional mode of said print system, wherein the bi-directional gamut includes first colors producible in both the forward-first directional mode and in the reverse-first directional mode, and wherein the converting includes mapping second colors, achievable in one directional mode but not the other, to first colors producible by both of said modes; and
  alternate between a forward-first color map and a reverse-first color map while printing said printable image, each of said color maps respectively mapping colors of said bi-directional gamut to print commands, said color maps being different.

13. A computer product as recited in claim 12 wherein said program code, when executed, further causes said print system to:
  prior to receiving said converting, printing a predetermined set solid composite-color patches on media of a first type using N-pass bi-directional printing;
  spectrographically analyzing said patches to determine forward-first and reverse-first gamuts respectively achievable by said forward first-and reverse-first print modes;
  generating said bi-directional gamut from said forward-first and reverse-first gamuts; and
  based on said spectrographic analysis, generating said forward-first and said reverse-first color maps so that they are constrained to said bi-directional gamut.

14. A computer product as recited in claim 13 wherein said bi-directional color map is equal to or within the intersection of said forward-first and reverse-first gamuts.

\* \* \* \* \*

UNITED STATES PATENT AND TRADEMARK OFFICE
CERTIFICATE OF CORRECTION

PATENT NO. : 8,511,770 B2  
APPLICATION NO. : 12/778338  
DATED : August 20, 2013  
INVENTOR(S) : Raul Rodriguez et al.

Page 1 of 1

It is certified that error appears in the above-identified patent and that said Letters Patent is hereby corrected as shown below:

In the Claims

In column 6, line 26, in Claim 2, delete "forward first-and" and insert -- forward-first and --, therefor.

In column 8, line 24, in Claim 13, delete "forward first-and" and insert -- forward-first and --, therefor.

Signed and Sealed this  
Third Day of December, 2013

Margaret A. Focarino  
*Commissioner for Patents of the United States Patent and Trademark Office*